July 17, 1951    J. BOLLONS    2,560,756
LAYOUT FIXTURE FOR CUTTING OPERATIONS ON WOODEN TRIM
Filed March 11, 1948    3 Sheets-Sheet 1
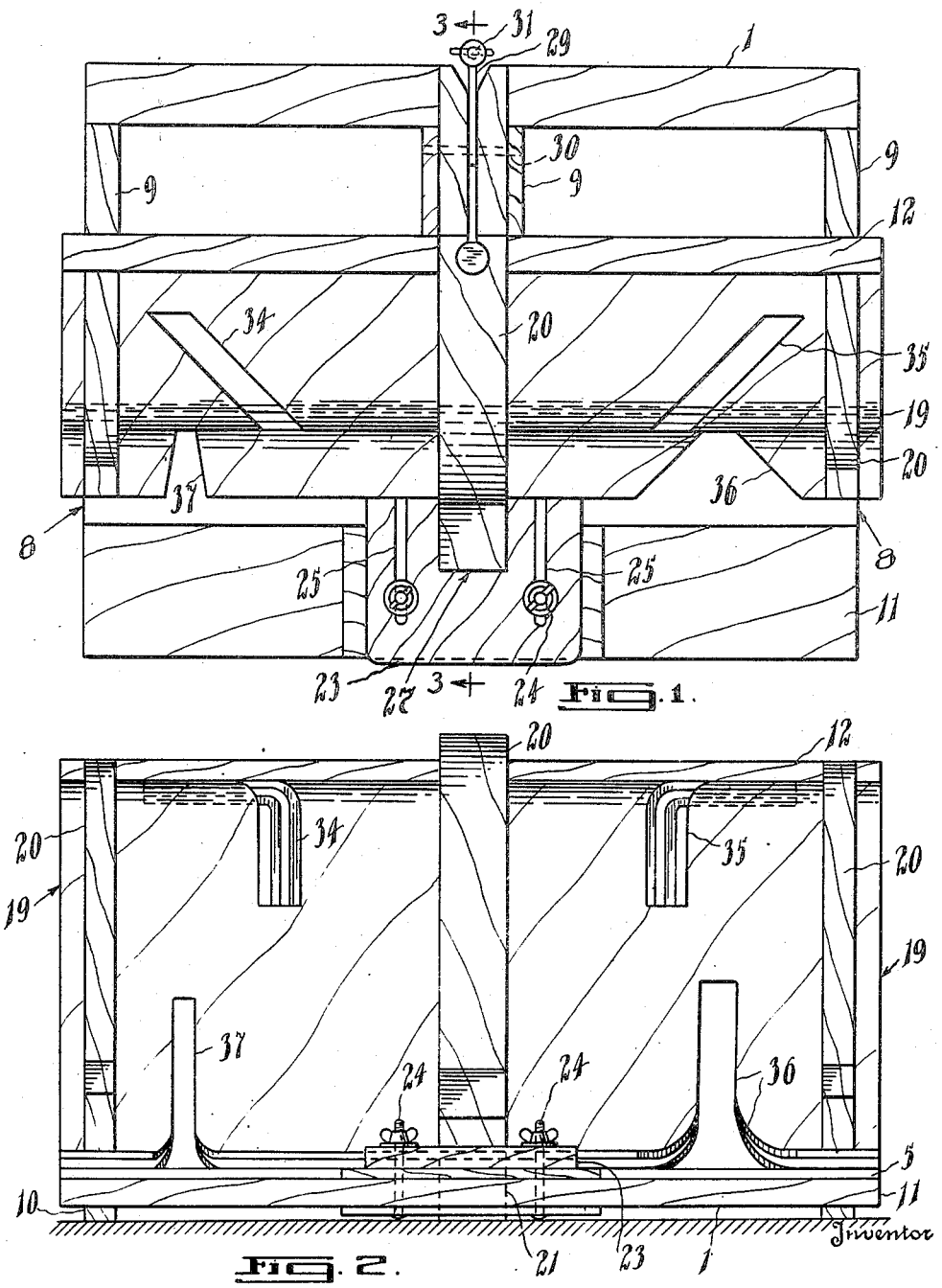
Joseph Bollons
By Frederick C. Bromley
Atty.

July 17, 1951  J. BOLLONS  2,560,756
LAYOUT FIXTURE FOR CUTTING OPERATIONS ON WOODEN TRIM
Filed March 11, 1948  3 Sheets-Sheet 2
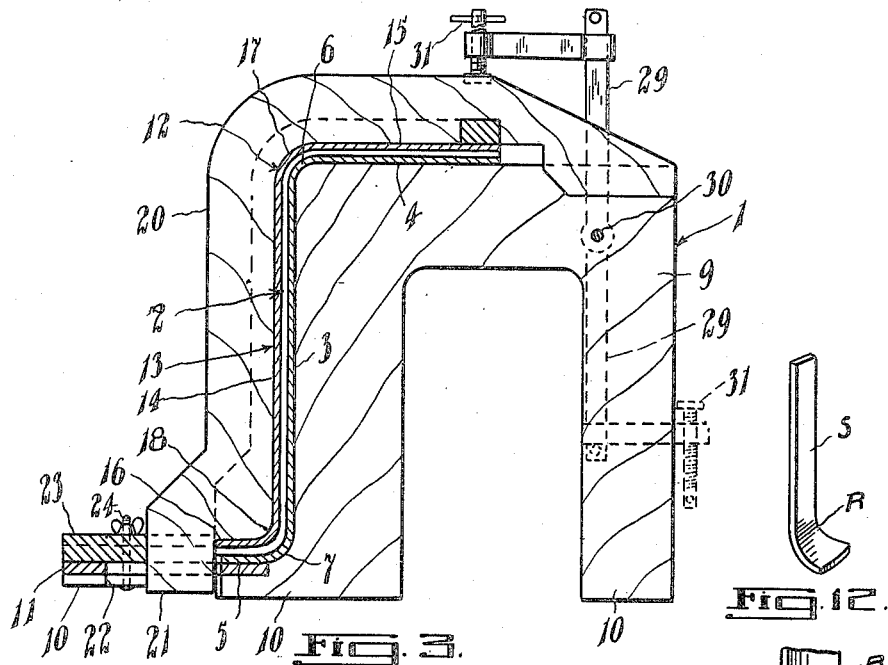
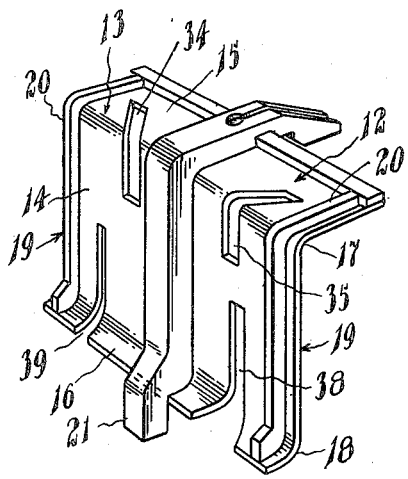
Inventor
Joseph Bollons
By Frederick C. Bromley
Atty.

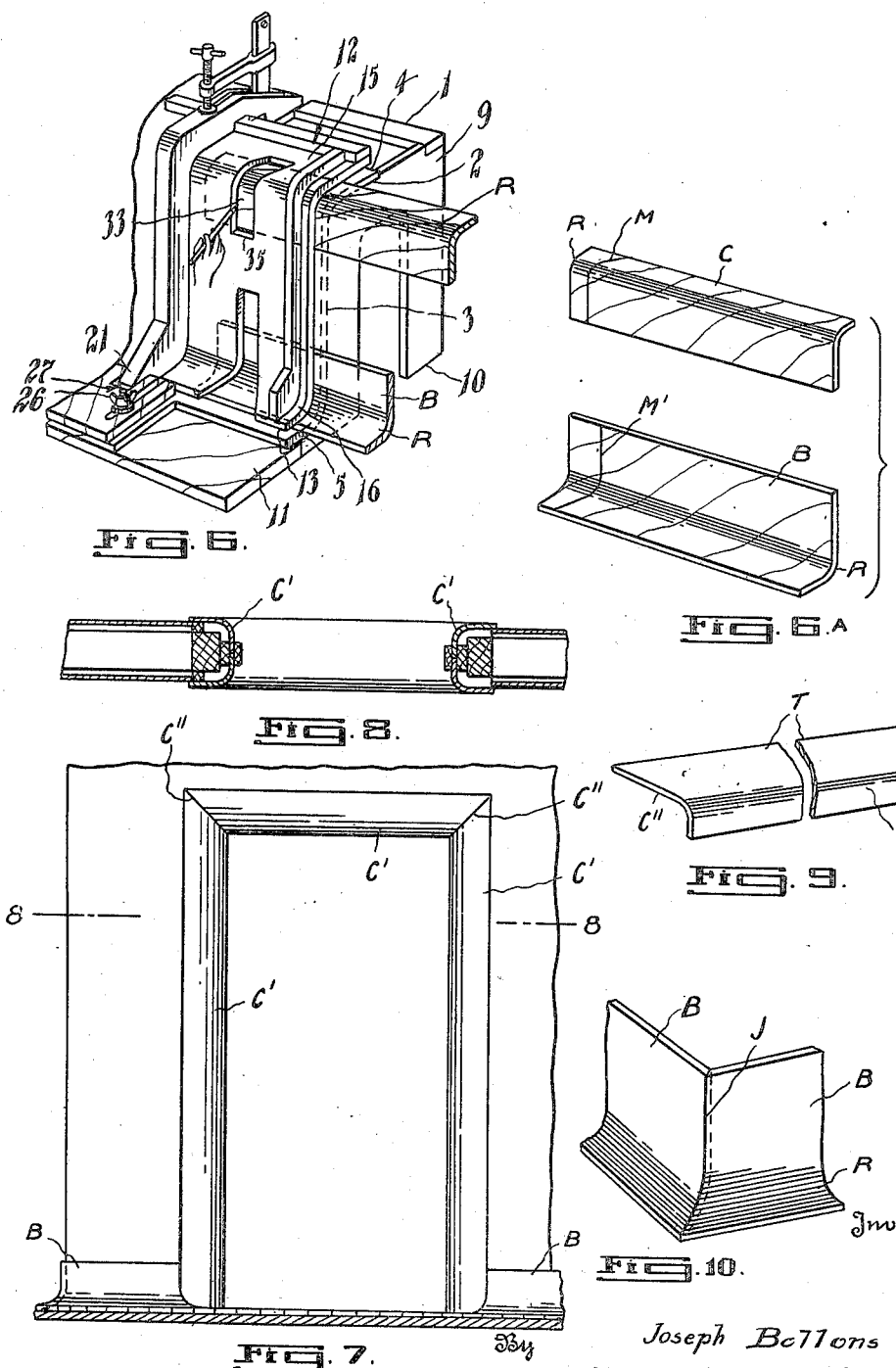

Patented July 17, 1951

2,560,756

UNITED STATES PATENT OFFICE 2,560,756

LAYOUT FIXTURE FOR CUTTING OPERATIONS ON WOODEN TRIM

Joseph Bollons, Willowdale, Ontario, Canada

Application March 11, 1948, Serial No. 14,238

2 Claims. (Cl. 33—174)

My invention relates to improvements in templates and fixtures for marking and cutting workpieces. More particularly it appertains to a clamping fixture for use in marking and cutting shaped plywood strips for trim of buildings.

In the erection and also in the renovation of buildings for offices and dwellings it is current practice to employ plywood trim for door casings, base boards, etc. This trim is manufactured in preformed strips of an angle shape in cross section with a rounded corner or cove portion. In cutting and fitting the strips for door casings and base boards, et cetera, considerable accuracy is required in order that mitre and other angular joints may fit exactly, otherwise the appearance of the job is marred. It is a difficult task to mark out the work for cutting it off exactly at the required angle for mitre joints, et cetera, and any warp which may be in a piece of the material obviously enhances the task. Moreover considerable time and skill is required to precisely mark the saw-cut lines on the individual strips of material by the usual hand methods.

Hence the object of the present invention is to provide a combined template and fixture in which an angle-shaped wooden strip can be held and marked by a line or lines drawn across the same along which it is to be cut by a saw. A distinctive feature of the device is that it is provided with slots having side edges disposed at the prescribed angles for marking off mitre and other angles on the piece of work to be cut.

A further distinctive feature of the device is that it comprises a fixed plate and a movable plate between which a workpiece is clamped and in which registering slots are provided for marking the workpiece from either side according to whether the measurement is to be from the front or back of the workpiece for the cut to be made.

Another object of the invention is to provide a combined template and fixture in which a workpiece can be held and marked with a transverse line by means of a slotted portion, and then can be partly pulled out of the fixture to expose the line and held while it is being sawn along this line.

Still another aim of the invention is to furnish a serviceable and inexpensive fixture of the kind referred to above by which plywood trim for buildings can be quickly and accurately cut to form mitre joints and other joints incidental to the use of the material.

With the foregoing objects in view the invention consists essentially in the novel construction and arrangement of a combined template and fixture as illustrated in the accompanying drawing, in which:

Fig. 1 is a top plan view of the device.

Fig. 2 is a front view thereof.

Fig. 3 is a cross section of the device taken on line 3—3 of Fig. 1.

Fig. 4 is a perspective view of the clamping plate.

Fig. 5 is a perspective view of the device as it appears when the clamping plate has been removed.

Fig. 6 is a perspective aspect of the assembled device showing how it is used to scribe a transverse line which is cut afterwards.

Fig. 6A illustrates pieces of trim which have been scribed by the use of the device ready for saw cutting.

Fig. 7 shows an interior wall of a building on which plywood trim is used for the casing of the door jamb and the base board.

Fig. 8 is a cross section on line 8—8 of Fig. 7.

Fig. 9 shows in perspective a piece of trim used for the top part of the door-frame casing.

Fig. 10 depicts a square corner joint commonly used in base board trim.

Fig. 11 is a plan view of a rounded corner joint commonly resorted to in the use of plywood trim for base boards.

Fig. 12 depicts a segment of the rounded corner joint shown in Fig. 11.

In order that the utility and advantages of the invention may be clearly understood and appreciated there is illustrated in Figs. 6A, and 7 to 12 inclusive, plywood trim commonly employed in the building industry for the casing of door frames and base boards. The material is especially bent to an L-shaped cross section at the factory and is in strip form. It will be noted that the corner portion R is rounded or coved. In Fig. 6A there is indicated at C a specimen of the material used for the casing C' of the door frame shown in Figs. 7 and 8. In cutting off the material on a 45° angle, as at C", it must be accurately scribed in order to produce a perfect mitre joint, which involves mitring both ends of the top strips of the case, one of which is shown at T in Fig. 9.

In Fig. 6A there is also shown at B a piece of the trim used for the base board depicted in Fig. 7. In Fig. 10 there is shown a square corner formed by the base board strips by means of a mitre joint J. Base board is also laid with a rounded corner such as that denoted in Fig. 11. The rounded corner, shown in Fig. 11, is built up of several segments S nailed and glued to a foundation block F, as is well known. One of the segments S is depicted in Fig. 12.

My invention is particularly designed to provide a combined template and fixture for use in scribing and cutting the trim above referred to. Having given a clear insight as to the utility of the invention, the invention itself will now be described.

The device comprises a hollow frame 1 having at its front a thin wall 2 forming a vertical section 3, a top horizontal section 4 extending rearwardly, and a bottom horizontal section 5 extending forwardly. The top and the bottom of the vertical section 3 is merged into the upper and lower sections 4 and 5 on a curvature indicated at 6 and 7 respectively.

The wall 2 constitutes an inner template and has slots therein for scribing workpieces as will be hereinafter fully explained. It will be noted that the lateral edges 8 of the wall 2 are in a vertical plane at right angles to the longitudinal extent of the wall. Said wall is integral with or secured to a purality of transversely arranged supporting members 9 which upstand and have base portions 10. Said supporting members are spaced apart and preferably are of an inverted U-shape so as to provide openings therethrough. The openings in the end supporting members enable access to be had to the interior of the frame 1 from its ends. The portion of the frame to the rear of the wall 2 is also open, as will be noted from an inspection of the drawings. Therefore it will be understood that the interior of the frame is accessible at the rear as well as at the ends. The base portion of the frame includes a base plate 11 rigid therewith, which extends forwardly of the bottom section 5 of the wall 2.

Cooperating with the frame above described is a loose clamping plate, indicated as a whole by the numeral 12, which is placed against the wall 2. The clamping plate comprises a thin wall 13 having a vertical section 14, a top horizontal section 15 extending rearwardly, and a bottom horizontal section 16 extending forwardly. The wall 13 thus conforms to the shape of the wall 2. The top and the bottom of the vertical section 14 is merged into the upper and the lower sections 15 and 16 on curvatures indicated at 17 and 18 respectively. The wall 13 constitutes an outer template and has slots therein for scribing workpieces as will be later explained. The lateral edges 19 of the wall 13 are in a vertical plane and this wall is of a length equal to the wall 2.

The clamping plate is preferably stiffened by means of ribs 20. At the bottom there is provided a tongue 21 which fits into an aperture 22 formed in the base plate 11 in order to constitute a part of a clamping mechanism. Desirably the tongue has limited play in the aperture 22 so that the clamping plate can be set and held by the tongue in a definite spaced relation with respect to the wall 2. An adjustable plate 23 is provided in the base plate 11 for enabling the tongue to retain the clamping plate in a set position. Said plate 23 is adjustable to and away from the wall 2 by means of bolts 24 extending through slots 25 and engaged by wing nuts 26. An edge 27 of the plate 23 serves as an abutment or thrust face for engaging the tongue.

The other part of said clamping mechanism consists of a standard clamp 29 pivoted at 30 on the central supporting members 9 of the frame 1 for swinging clear of the clamping plate 12 to enable the clamping plate to be detached. In its position of use the camp 29 fits over the clamping plate 12 and is adapted to bear on the top thereof by means of the hand screw element 31.

Now turning to the slots for scribing workpieces, it will be seen that the inner wall 2 of the frame and the outer wall 13 are both supplied with an upper set of slots and a lower set of slots. The upper set of slots in the inner wall 2 comprise elongated openings as at 32 and 33, each having a vertical part in the vertical section 3 and a continuation part in the top horizontal section 4 extending at an angle of 45°. The slots 32 and 33 are similar to each other except that their upper angular portions extend in opposite directions, as will be clearly seen from an inspection of Fig. 5. A side edge of each of these slots is used as a guide face in scribing a line on a workpiece from the inside of the frame 1 for cutting it off to length to form a mitre joint. The workpiece, to wit, the bent plywood trim C for the door casing C' is placed in the fixture by inserting it endwise between the walls 2 and 13 so that its rounded corner portion R is disposed at the upper rounded corners 6 and 17 of these walls, as is clearly shown in Fig. 6. When the workpiece has been properly positioned in the fixture for scribing it at a desired point it is then clamped by the clamping plate 12 by tightening the hand screw 31. Having secured the workpiece in place the carpenter can reach into the hollow frame 1 and draw a line for cutting it off on an angle to form a mitre joint by using a side of one of the slots 32 or 33 as a guide face for a scriber, such as a pencil. From this it will be understood that the slots 32 and 33 enable the workpiece to be marked on its inner face for a saw cut.

The upper set of slots in the wall 13 are indicated at 34 and 35. These slots are similar in size and shape to the slots 32 and 33. The slot 34 is in register with the slot 32, and the slot 35 is in register with the slot 33. A side edge of the slots 34 and 35 is used as a guide face in scribing a line on the outer face of a workpiece from the outside of the clamping plate 12. For this purpose the workpiece is clamped in the fixture as explained relative to the use of the slots 32 and 33. Portions of the outer face of the bent strip of plywood are exposed to view through the slots 34 and 35 and a line can be readily scribed thereon for cutting the strip to length with an angular end portion for making a mitre joint. Fig. 6 shows how the workpiece is marked. It will be understood that the workpiece can be readily removed by slackening the hand screw 31. In Fig. 6A the strip of casing material is shown as scribed by a line designated M for a saw cut.

The lower set of slots in the wall 2 is formed by two elongated openings 36 and 37, each having a vertical part in the vertical section 3 and a continuation part in the lower horizontal section 5, which is flared. The longitudinal side edges of the slot 36 have their lower parts disposed at a 45° angle so that either side of the slot may be used for scribing a transverse line on the rear face of the base board strip B from the inside of the hollow frame 1 for cutting the strip in order to form a mitre joint. By reference to Fig. 6, it will be seen that the strip is held between the template walls 3 and 13 in the marking operation. The slot 37 has its lower extent flared for marking a piece of the base board in order to cut from it a segment S for making the rounded corner of base board trim, shown in Fig. 11.

The slots of the lower set in the wall 13 are indicated at 38 and 39. These slots are similar in size and shape to the slots 36 and 37. The slot 38 is in register with the slot 36, and the slot 39 is in register with the slot 37. The angular side edges of the slots 38 and 39 are used for scribing transverse saw lines on the front face of the base board trim. Such a marking is shown at M' on the strip B in Fig. 6A.

From the foregoing description it will be manifest that the invention provides a combined template and fixture in which bent trim material can be held and accurately marked for cutting, and that the invention enables the material to be marked upon its inner face or outer face according to requirements. Moreover it is to be understood that the fixture may be employed to hold the trim material while it is being cut to size. For this purpose the material, when marked with a cutting line, is partly withdrawn from the fixture to expose the line endwise of the fixture so that a saw can be used on the line. Although the fixture is primarily intended for scribing the material in making angular cuts, it may also be used for cutting the material to prescribed lengths with a square end by using the lateral edges 8 and 19 as guide surfaces. The adjustable plate 23 provides for spacing the clamping plate to suit the thickness of the trim material so that the material can be inserted between the template walls for a marking and/or cutting operation.

Having described the preferred embodiment of the invention, it will be understood that such changes and modifications may be resorted to as fairly come within the scope of the appended claims.

What I claim is:

1. A layout fixture for marking and cutting wooden trim of a right angular cross section, said fixture comprising a rigid frame, a clamping plate, and clamping means; said frame including a front part having a vertical wall, a top part having a horizontal wall extending rearwardly from the upper end of said vertical wall and having a vertical-walled slot disposed rearwardly of said horizontal wall, a base part having a horizontal wall extending forwardly of the lower end of said vertical wall, said base part being supplied with an opening immediately in front of said horizontal wall thereof, and means providing an adjustable abutment outwardly of said opening; said clamping plate including a vertical wall, an upper horizontal wall extending rearwardly from the upper end thereof, a lower horizontal wall extending forwardly from the lower end thereof, and a tongue extending downwardly in front of said lower horizontal wall, said tongue being inserted in said opening and engaged with said abutment; said clamping means including a clamp pivoted in said vertically-walled slot, and a hand screw element on said clamp for applying down pressure on said top part of the clamping plate.

2. A layout fixture as set forth in claim 1, and in which the adjustable abutment comprises a plate having an abutment face, and fastening elements securing said plate on said base part of the frame and permitting of adjustment thereof.

JOSEPH BOLLONS.

REFERENCES CITED

The following references are of record in the file of this patent:

UNITED STATES PATENTS

| Number | Name | Date |
|--------|------|------|
| 398,539 | Rock | Feb. 26, 1889 |
| 1,047,588 | Stull | Dec. 17, 1912 |
| 1,125,010 | Dover | Jan. 12, 1915 |
| 1,458,637 | Anderson | June 12, 1923 |
| 1,469,395 | Richard | Oct. 2, 1923 |
| 1,563,667 | Smith | Dec. 1, 1925 |
| 1,611,930 | MacLeod | Dec. 28, 1926 |
| 1,906,461 | Graham | May 2, 1933 |
| 2,024,112 | Phillis | Dec. 10, 1935 |